US011970021B2

(12) United States Patent
Miclo

(10) Patent No.: US 11,970,021 B2
(45) Date of Patent: Apr. 30, 2024

(54) METHOD FOR PRODUCING A PROFILED STRIP HAVING IMPROVED CONNECTING MEANS

(71) Applicants: INOVAME, Duppigheim (FR); KREAFIN GROUP SA, Luxembourg (LU)

(72) Inventor: Thierry Miclo, Hoenheim (FR)

(73) Assignees: INOVAME, Duppigheim (FR); KREAFIN GROUP SA, Luxembourg (LU)

( * ) Notice: Subject to any disclaimer, the term of this patent is extended or adjusted under 35 U.S.C. 154(b) by 764 days.

(21) Appl. No.: 16/977,133

(22) PCT Filed: Feb. 25, 2019

(86) PCT No.: PCT/IB2019/051494

§ 371 (c)(1),
(2) Date: Sep. 1, 2020

(87) PCT Pub. No.: WO2019/175695

PCT Pub. Date: Sep. 19, 2019

(65) Prior Publication Data

US 2021/0001662 A1 Jan. 7, 2021

(30) Foreign Application Priority Data

Mar. 16, 2018 (BE) .................................. 2018/5173

(51) Int. Cl.
*B44C 5/04* (2006.01)
*E04F 15/02* (2006.01)
*E04F 15/10* (2006.01)

(52) U.S. Cl.
CPC .......... *B44C 5/04* (2013.01); *E04F 15/02038* (2013.01); *E04F 15/105* (2013.01);
(Continued)

(58) Field of Classification Search
CPC .... B44C 5/04; B44C 5/0461; E04F 15/02038; E04F 15/105; E04F 2201/0146;
(Continued)

(56) References Cited

U.S. PATENT DOCUMENTS

2023/0020659 A1* 1/2023 Iannacone, III ...... E04F 11/166

FOREIGN PATENT DOCUMENTS

WO WO/2006/103565 10/2006
WO WO/2013/151494 10/2013

OTHER PUBLICATIONS

Search Report for International Patent Application PCT/IB2019/051494, dated Sep. 19, 2019.

* cited by examiner

*Primary Examiner* — Rick K Chang
(74) *Attorney, Agent, or Firm* — FRESH IP PLC; Clifford D. Hyra; Aubrey Y. Chen

(57) ABSTRACT

The present invention relates to a method for producing a profiled strip (1) comprising: a first longitudinal side (2A), provided with first male connecting means and a second longitudinal side (2B) situated opposite the first longitudinal side (2A) and provided with first female connecting means, which profiled strip (1) is furthermore provided, on a first end side (3A), with second male connecting means and is provided, on a second end side (3B) situated opposite the first end side (3A), with second female connecting means, wherein said connecting means are suitable for connecting the longitudinal sides (2A, 2B) and/or the end sides (3A, 3B) of adjacent profiled strips (1, 1') to each other, wherein the method comprises the following steps:

supplying a panel-shaped profiled section made of plastic;
sawing the profiled section produced to the desired length;
(Continued)

performing one or several milling operations in order to produce at least one foldable flexible projecting element (6*a*) on the first end side (3A) of the sawed profiled section;

heating the produced projecting element (6A) and subsequently bending it at a desired angle in relation to the end side (3A) in order to form a bent locking element (6*b*).

16 Claims, 12 Drawing Sheets

(52) U.S. Cl.
CPC ..... *B44C 5/0461* (2013.01); *E04F 2201/0146* (2013.01); *E04F 2201/023* (2013.01); *E04F 2201/042* (2013.01)

(58) Field of Classification Search
CPC .......... E04F 2201/023; E04F 2201/042; B27B 5/04; B27C 5/00; B27F 1/02; B27M 3/0026; B27M 3/04
See application file for complete search history.

Fig 2.b.

Figure 9A:
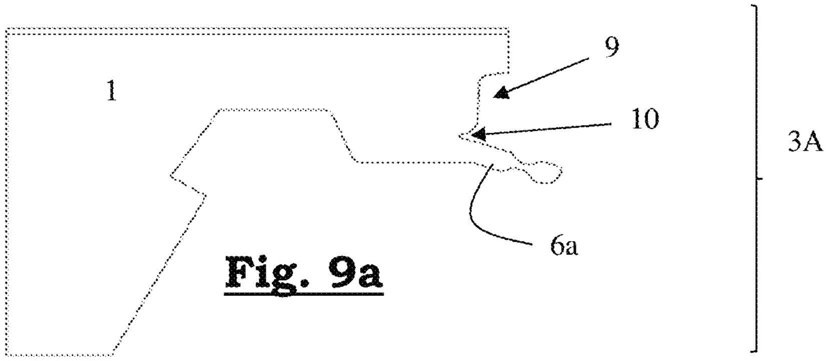
Figure 9B:
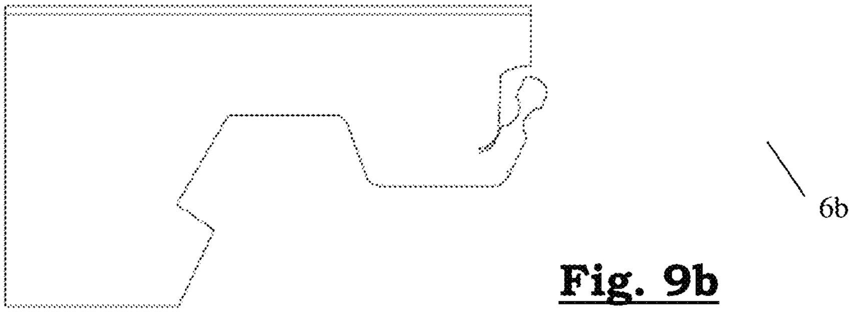
Figure 9C:
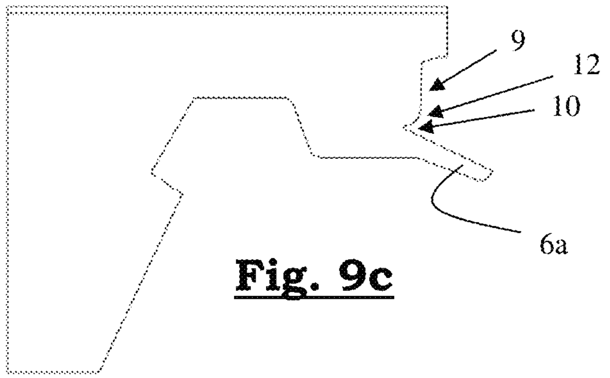
Figure 9D:
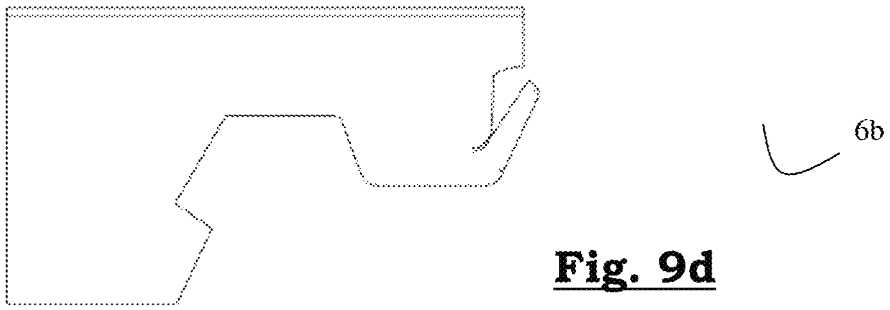

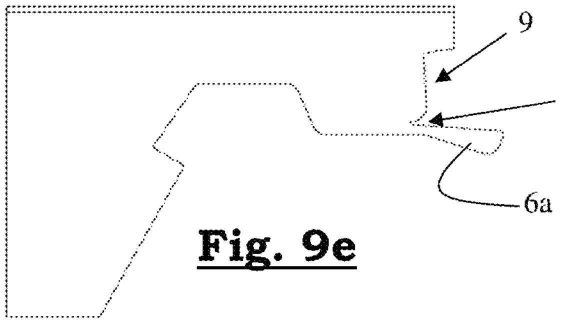
Fig. 9e
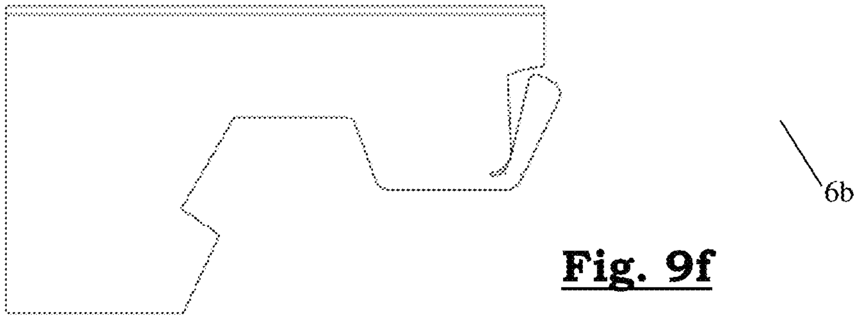
Fig. 9f
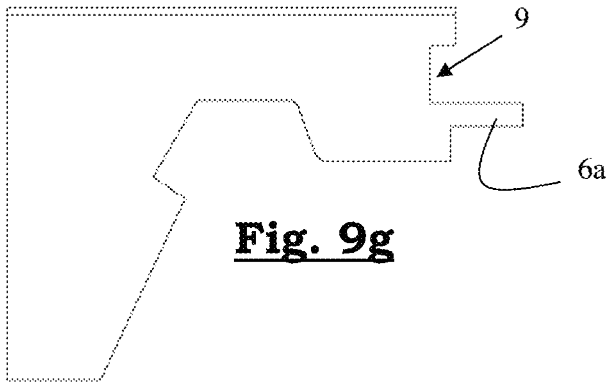
Fig. 9g
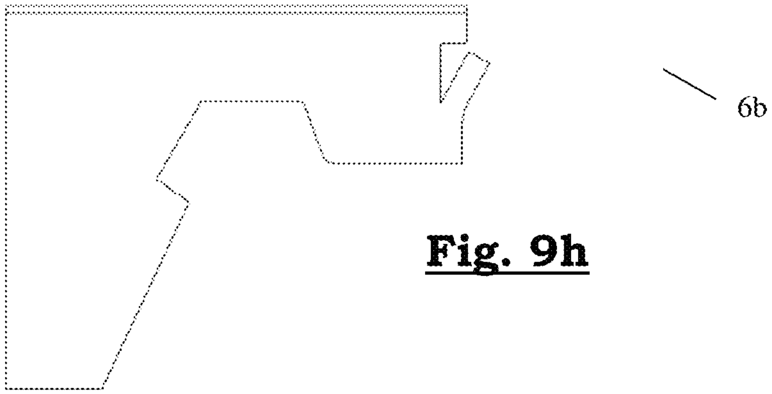
Fig. 9h
Fig. 9

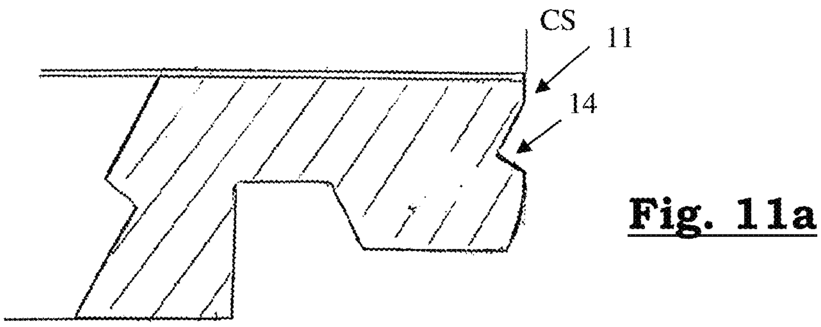
Fig. 11a
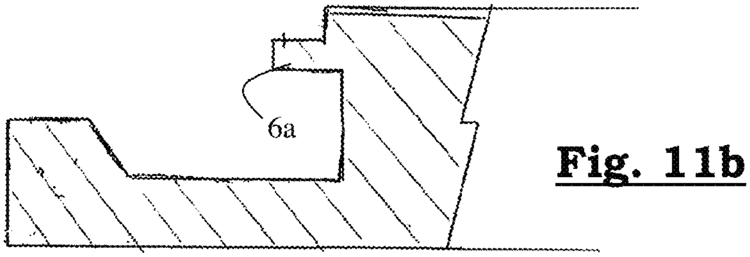
Fig. 11b
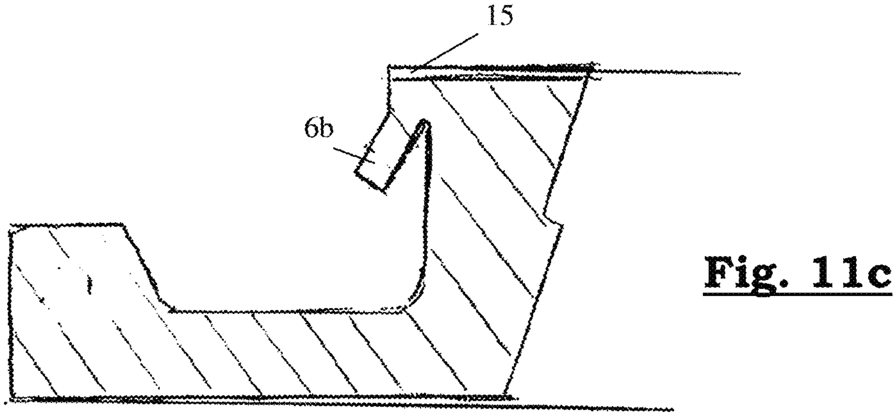
Fig. 11c
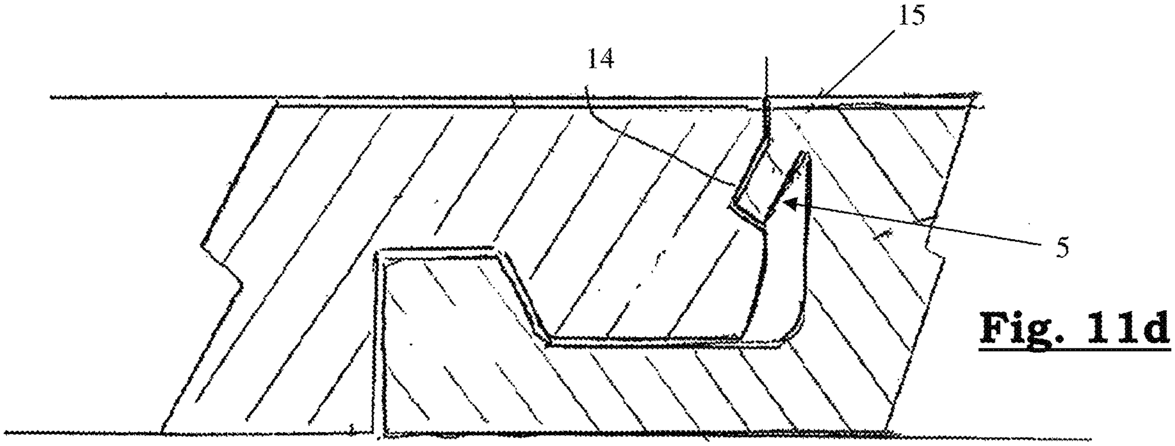
Fig. 11d
Fig. 11

METHOD FOR PRODUCING A PROFILED STRIP HAVING IMPROVED CONNECTING MEANS

The present invention relates to a method for producing a profiled strip comprising a visible side, a first longitudinal side, provided with first male connecting means and a second longitudinal side situated opposite the first longitudinal side and provided with first female connecting means, which profiled strip is furthermore provided, on a first end side, with second male connecting means and is provided, on a second end side situated opposite the first end side, with second female connecting means, wherein the said connecting means are suitable for connecting adjacent profiled strips by the first or second male connecting means engaging in the first or second female connecting means. The profiled strip obtained by means of the method may be both a floor or a wall panel (element) in the form of a tile or board. The resulting profiled strip (panel) is made from plastic, preferably from vinyl or PVC.

When connecting floorboards which do not use gluing techniques, several systems are known which differ by the way in which the floorboards can be joined.

For the Long Side of the Floorboard:

a) Connecting one floorboard horizontally and the other floorboard via an angle to the first floorboard;
b) Connecting one floorboard horizontally and the other floorboard via a rotating movement to the first floorboard.

The most well-known present systems are described in the following patent publications: BE 9600527; BE 9700344; EP 0843763 and EP 1026341.

For the Short Side of the Floorboard Once the Longitudinal Connection has been Achieved:

a) Joining by means of a horizontal movement of both floorboards with respect to each other, the so-called "snap connection";
b) Connecting one floorboard horizontally and the other floorboard by means of a vertical movement to the first floorboard. The so-called "fall-down" or "push-down" connections.

A significant drawback of the horizontal movement, better known as the snap movement, of the floorboards with respect to each other is the fact that, on the one hand, an accessory and hammer are required and that the force exerted by means of the "hammering together" of the floorboards may result in damage to the decorative top layer. The same phenomenon may occur if the accessory, which is intended to prevent damage to the projecting tooth at the other end of the floorboard to be connected, is not handled correctly. When using the hammer for horizontally moving the floorboards with respect to each other, the force used to hammer on the correctly positioned accessory has to be regulated in order to achieve a strong connection. In addition, it is also important for the moving floorboard to be taken towards the other floorboard in a steady manner so as to also prevent damage. It is known in practice that this is practically impossible as well, due to the point load of the hammer.

Due to the issues described which are associated with the horizontal snap connection, a user-friendly technology is being developed, namely the vertical connection of the panel to be fastened with respect to the horizontally positioned panel. More specifically, the fall-down or push-down technology.

However, with the most common known vertical connecting techniques, there remains a problem with regard to possible damage of the connecting means due to the vertical force which will have to be exerted, in most cases, still using a hammer in order to achieve a correct locking strength after juxtaposed profiled strips have been fitted.

Another common problem is the fact that the connection can absorb only small upward forces caused by unevenness of the floor. Often, the force with which the floorboards are joined is also the force with which they can come apart (cf. EP 0085196 and EP 0562402). The force with which the floorboards can come apart again is also referred to as the locking strength. In this known embodiment, the force used to press the floorboards together at the end side by means of a vertical force is often the same as the eventual locking strength. A low vertical force for connecting floorboards arranged next to each other to each other, such as can be exerted by a thumb, will eventually also result in a low locking strength. In order to solve this last problem, several versions are known which use inserts made from a different material than the floorboard itself (cf. EP 1 650 375 and EP 1 415 056) in order to increase the locking strength and to thus be able to absorb greater upward forces.

European patent publication EP 3 121 348 describes a panel comprising a body with at least one plastic layer wherein the longitudinal sides and/or the end sides are provided with complementary hook-shaped connecting means. In order to prevent the connection between two adjacent panels (sides) from becoming detached, the panel is provided with first vertical locking means. To this end, the connecting area of the one side is provided with a locking element in the form of a groove and the connecting area of the adjacent side is provided with a locking part which cooperates with the locking element and is in the form of a projecting part. In order to achieve an even better vertical lock, the panel described in EP 3 121 348 comprises second vertical locking means in the form of a foldable lip which engages in a recess provided for the purpose. However, this solution has the drawback that the panels have to be sufficiently thick in order thus to have sufficient space (matter) in order to obtain a sufficiently large locking strength by means of a foldable lip. This is the result of the limitations in the design which the foldable lip may have.

In addition, in accordance with the proposed procedure of milling the flexible locking lip, there is a greater risk of this lip breaking off after the connection has been brought about during fitting of the floorboards, as a result of material fatigue in combination with a notch effect at the location where the flexible locking lip is still connected to the body of the panel following milling. The foregoing is pernicious as the connections of the floorboards have to be taken into account when there is a relevant dynamic load on the connections during use of the floor.

It is now an object of the present invention to provide a method which makes it possible to provide a profiled strip provided with vertical locking means in which the risk of them breaking off due to the exerted dynamic loads or occurring when disassembling the profiled strips arranged next to each other by means of a tilting movement is minimal.

The profiled strip produced by means of the present method preferably has a reduced thickness, preferably a thickness of between 3 mm and 12 mm, preferably having a thickness of 4 mm to 6 mm, wherein the user has the possibility of connecting profiled strips to each other in any desired direction in order thus to be able to create different laying patterns.

The object of the invention is achieved by providing a method for producing a profiled strip, comprising: a first longitudinal side, provided with first male connecting means and a second longitudinal side situated opposite the first longitudinal side and provided with first female connecting means, which profiled strip is furthermore provided, on a first end side, with second male connecting means and is provided, on a second end side situated opposite the first end side, with second female connecting means, wherein the said connecting means are suitable for connecting adjacent profiled strips by the first or second male connecting means engaging in the first or second female connecting means, wherein the method comprises the following steps:

supplying a panel-shaped profiled section made of plastic;

sawing the profiled section produced to the desired length;

performing one or several milling operations in order to produce at least one foldable projecting element on the first end side of the sawed profiled section;

heating the produced projecting element and subsequently bending it at a desired angle in order to form a bent locking element.

The produced bent locking element is preferably a locking lip which is formed by heating up the milled-out projecting element and bending it to form a bent locking element. By producing the locking element in this way, a locking element having a much greater locking strength results. In addition, there are many more possibilities of modifying the design of the locking element. Due to the fact that bending is only carried out after milling, there is much greater freedom with regard to the design for the locking element. For example, whereas it was impossible in the past with certain embodiments to mill out a downwardly directed locking element in the female connecting means, the present method allows a projecting element on a side of the profiled strip to be milled which will subsequently be heated and bent to form a bent locking element in a perfect manner.

Heating will be effected by means of a heating element, e.g. an infrared heater or an industrial heater or a nozzle with hot air which will bring the material to the suitable temperature at which the material of the projecting element becomes mouldable. Once the material has become mouldable, the projecting element is bent at a desired angle in the direction of the end side and temporarily held there until the material has cooled down. After cooling down, a bent element is formed. The bent element bears against a part of the body of the profiled strip. The part of the body against which the bent element partly bears forms a support for the bent element and is formed while the milling operations are being carried on the first end side. The respective support preferably has a curved configuration. The distal end of the bent projecting element does not bear against the profiled strip body, as a result of which it is displaceable (depressable), as a result of which it will be displaced in the direction of the profile body while connection to an adjacent profile takes place and it will return to its original position after the connection has been achieved and will consequently, in the connected position, make contact with a locking part which is suitable for the purpose and provided in the adjacent profile.

This novel way of producing a locking element (lip), in particular by means of thermoforming, has numerous advantages:

it can be used with a large number of base materials from which the profiled strip is made, preferably PVC or polyolefines, such as PE or PP;

it can be used with profiled strips of reduced thickness, preferably a thickness of 4 mm to 6 mm;

it is possible to produce complicated connecting systems.

The method according to the invention makes it possible to make the locking element more flexible, so that the profiled strip, when connected to an adjacent profiled strip, can be removed again more easily without causing damage, in particular to the locking element. The resulting locking element can be used to produce a vertical lock. With the known profiled strips, a profiled strip would only be detached again by performing a sliding movement. It was not possible to detach the profiled strips from each other by means of a simple rotating movement without damage to the locking elements.

Using the method according to the invention, it is also possible to produce end connecting means which make it possible to connect a profiled strip to the end side or a longitudinal side of an adjacent profiled strip by means of its end side. It is also possible to provide the first or second longitudinal side with a locking element which is formed by milling out a projecting element and subsequently heating, bending and, optionally, cooling it.

Preferred embodiments are described in the dependent claims.

There now follows a more detailed description of the method for producing a profiled strip (the wall or floor panel) according to the invention in order to explain the properties of the present invention and to indicate additional advantages and particulars thereof. It will be clear that nothing in the following description may be interpreted as a limitation of the scope of protection defined in the claims.

Figure 1:
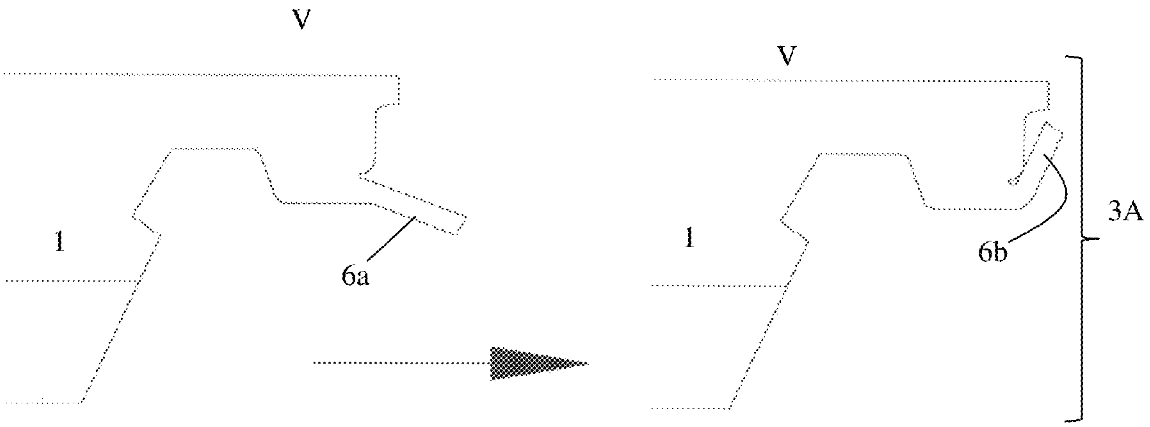
Figure 2A:
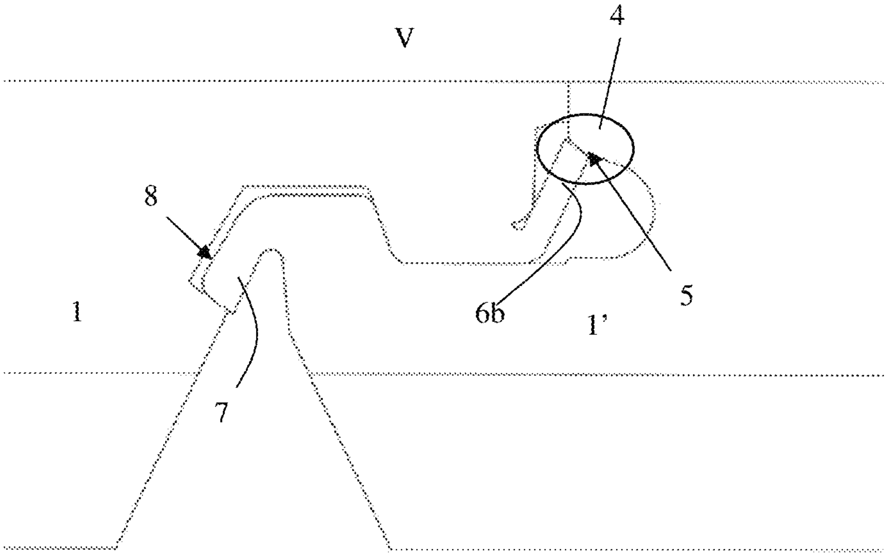
Figure 3:
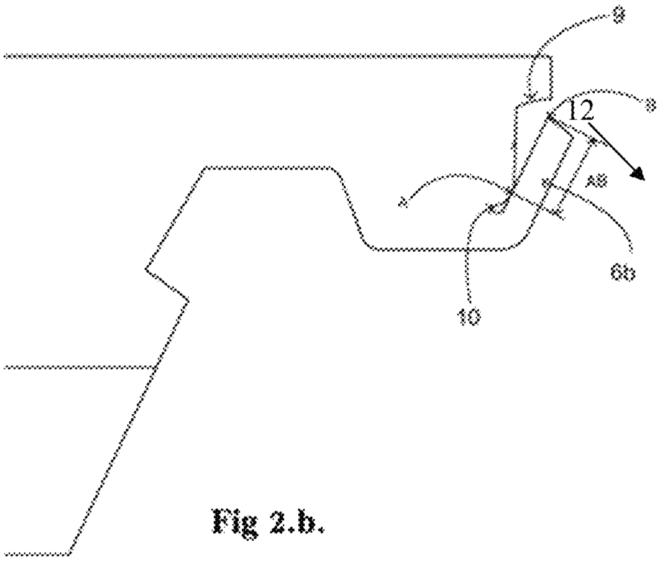
Figure 3:
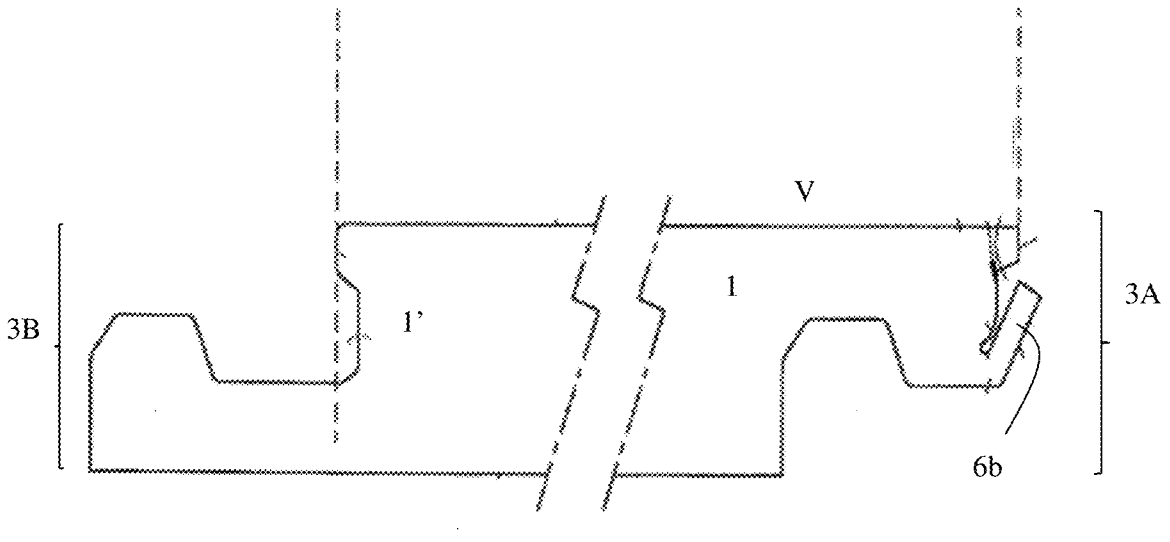
Figure 4:
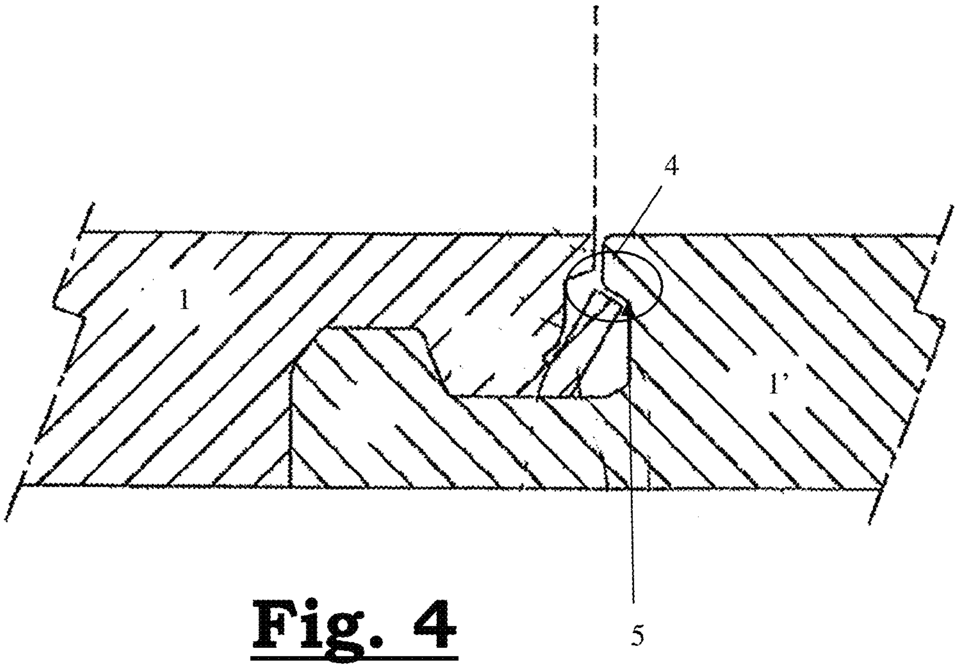
Figure 5:
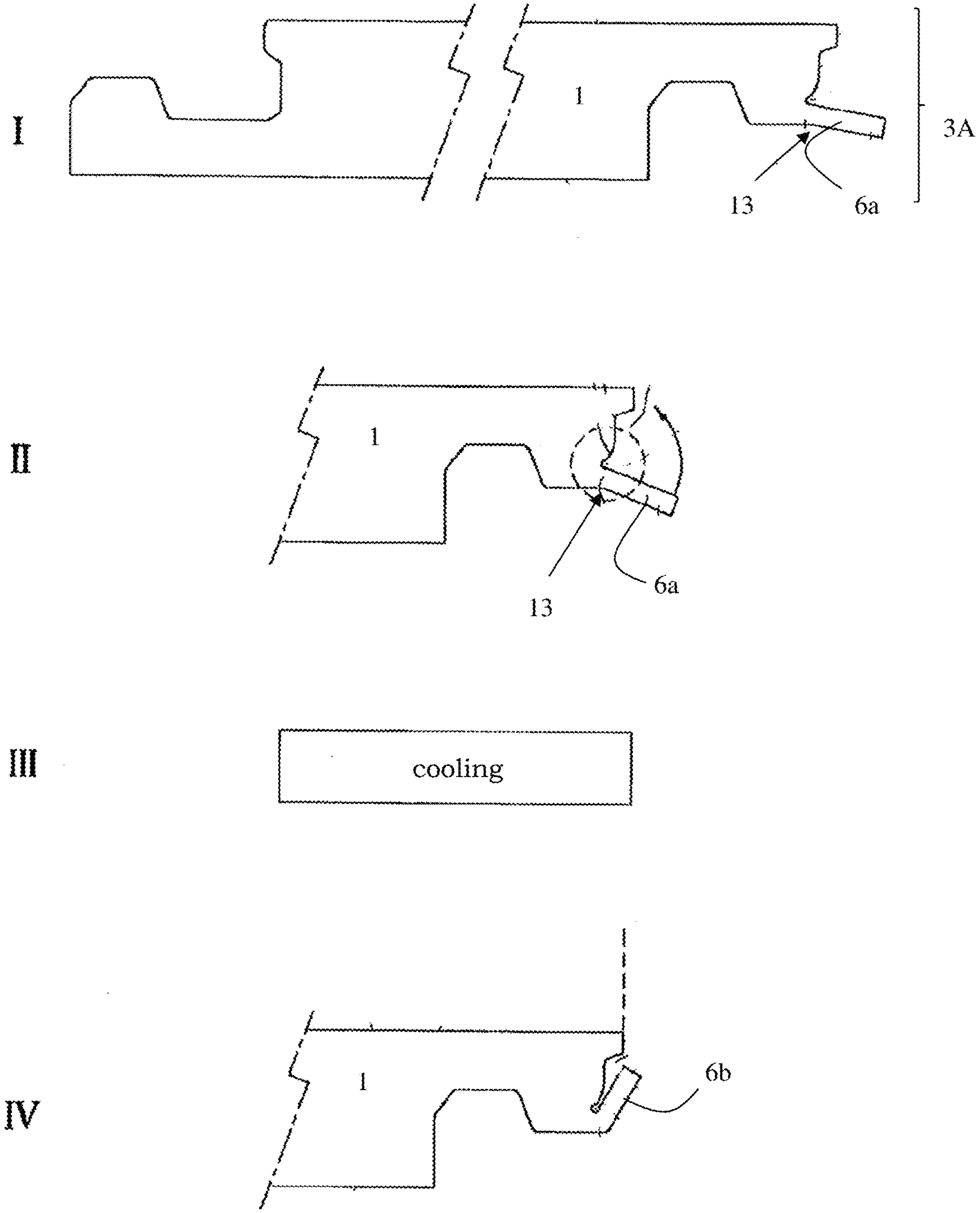
Figure 6:
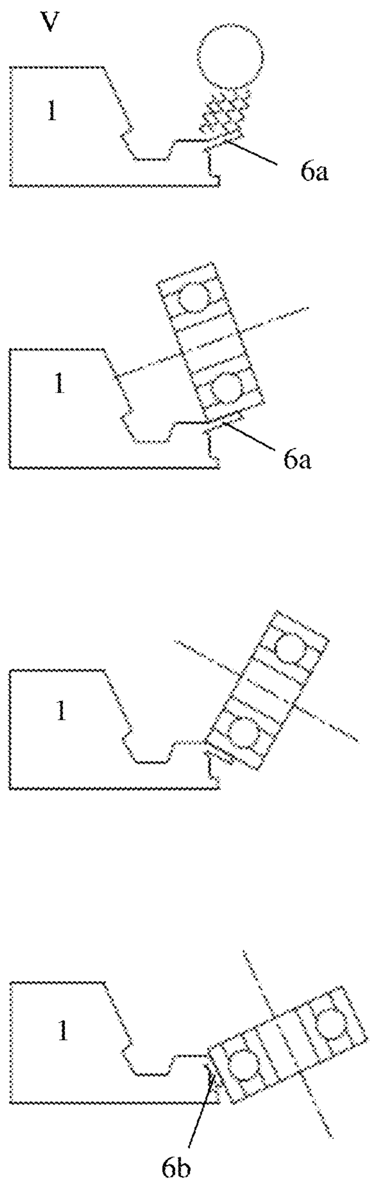
Figure 7:
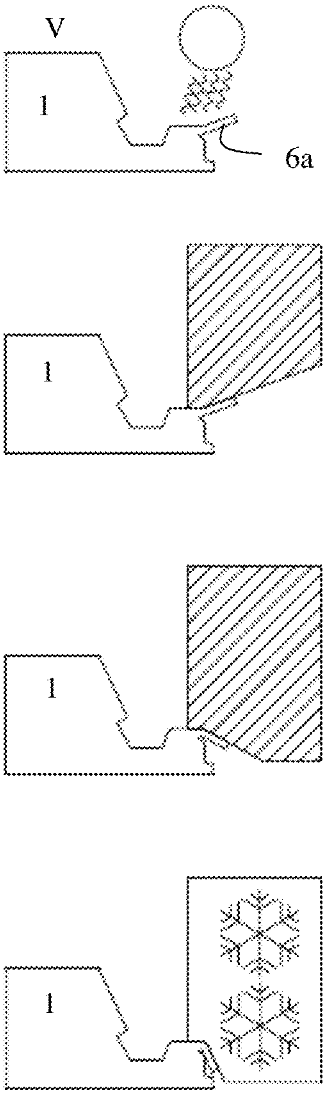
Figure 8:
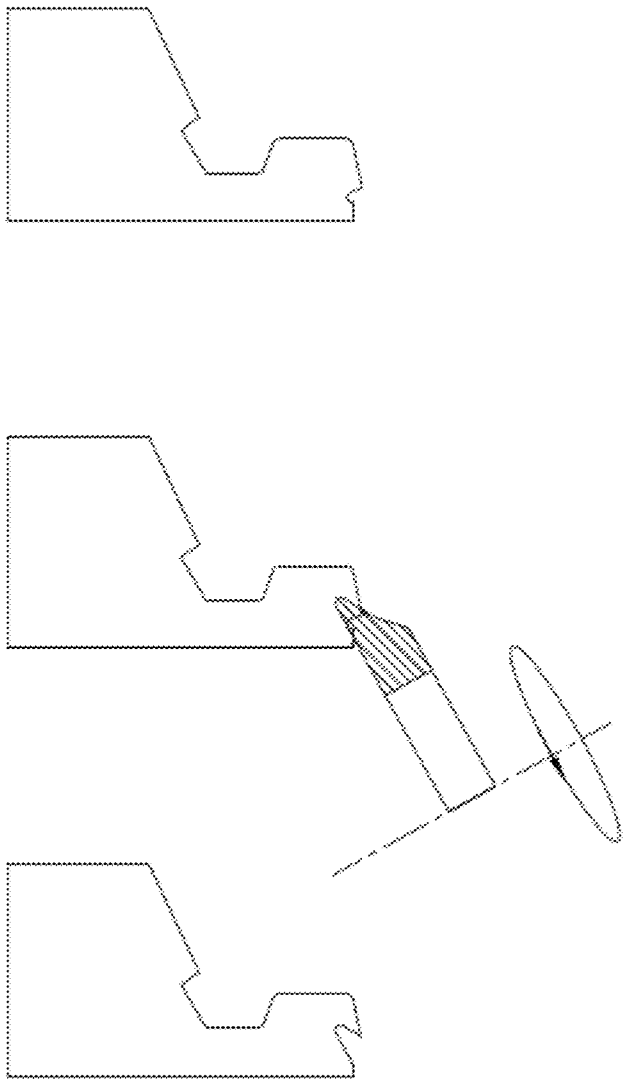
Figure 10:
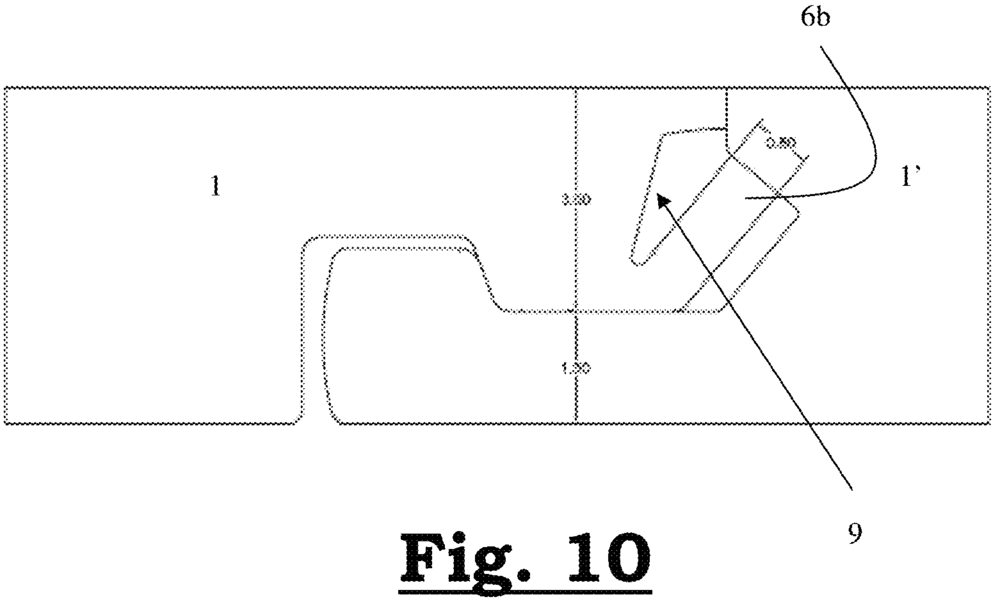
Figure 12:
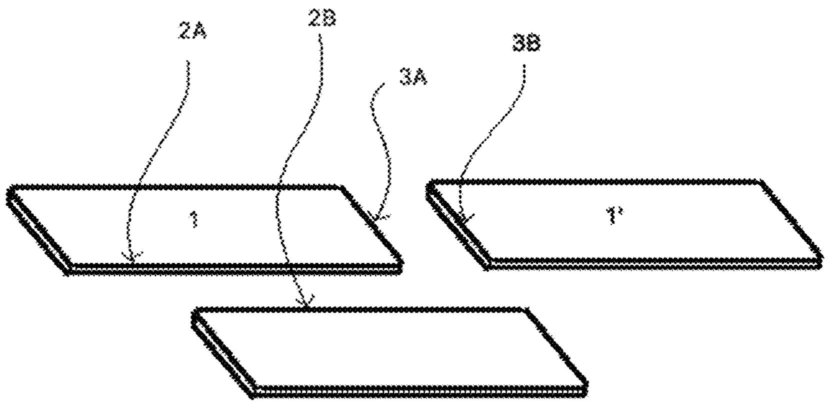

In this description, reference numerals are used to refer to the attached drawings, in which:

FIG. 1: shows the bending of a projecting element which has been formed by means of a milling operation in order to form a bent locking element (6*b*) suitable for producing a vertical lock between two adjacent profiled strips;

FIG. 2*a*: is a representation of the connection of a possible embodiment of the first end side as illustrated in FIG. 1, with the second end side or the second longitudinal side of an adjacent profiled strip;

FIG. 2*b*: is an illustration of the distance (AB) between the distal end of the flexible part of the bent locking element (6*b*) and the location where the flexible part bears against the profile body;

FIG. 3: shows a diagrammatic cross section of an alternative profiled strip manufactured according to the method according to the invention;

FIG. 4: shows the connection of two adjacent profiled strips, as shown in FIG. 3, by means of their end sides;

FIG. 5: shows, in parts I-IV, the various steps of producing the locking element on a profiled strip manufactured according to the method according to the invention;

FIGS. 6 and 7: show, in steps, two different ways of bending a projecting element in order to produce a locking element;

FIG. 8: shows, in steps, an alternative way of producing a locking element by means of a milling operation;

FIG. 9: shows, on the one hand, a number of possible embodiments of the projecting element (6*a*) (FIGS. 9*a*, 9*c*, 9*e* and 9*g*) and, on the other hand, in the bent position, in which the locking element (6*b*) is formed (FIGS. 9*b*, 9*d*, 9*f* and 9*h*);

FIG. 10: shows an embodiment of profiled strips manufactured according to the method which are connected to each other, wherein the bent locking element (6*b*) is relatively thick, and wherein only a first inwardly directed recess is provided in the first end side, no second inwardly directed recess;

FIG. 11: FIGS. 11*a*-11*c* show a number of steps of the method wherein, by means of a milling operation, a projecting element was produced in one of the female connecting means (FIG. 11*b*) which was then bent by means of heat to form a bent element (FIG. 11*c*); FIG. 11*d* shows two profiled strips in a connected position;

FIG. 12: is a representation of a number of profiled strips according to the invention which are connectable to each other.

A profiled strip (1) comprising: a first longitudinal side (2A), provided with first male connecting means and a second longitudinal side (2B) situated opposite the first longitudinal side (2A) and provided with first female connecting means, which profiled strip (1) is furthermore provided, on a first end side (3A), with second male connecting means and is provided, on a second end side (3B) situated opposite the first end side (3A), with second female connecting means, wherein said connecting means are suitable for connecting the longitudinal sides (2A, 2B) and/or the end sides (3A, 3B) of adjacent profiled strips to each other is illustrated in FIG. 12. Such a profiled strip is produced by means of a method which comprises at least the following steps:

supplying a panel-shaped profiled section made of plastic;

sawing the profiled section produced to the desired length;

performing one or several milling operations in order to produce at least one foldable flexible projecting element (6*a*) on the first end side (3A) of the sawed profiled section;

heating the produced projecting element (6*a*) and subsequently bending it at a desired angle in order to form a bent locking element (6*b*).

The produced locking element is a locking lip which is formed by first performing a milling operation, thereby forming a projecting element (6*a*), heating this element (6*a*) and bending it to form a bent locking element (6*b*). The distal end of the bent locking element (6*b*) does not make contact with the profile body, as a result of which it is displaceable (depressable), as a result of which it will be displaced in the direction of the profile body while connection to an adjacent profile takes place and it will return to its original position after the connection has been achieved and will consequently, in the connected position, as illustrated in FIGS. 2*a* and 4 produce a vertical lock (see the circled area denoted by reference numeral 4) in which the distal end of the bent locking element (6*b*) can make contact with a locking part (denoted by reference numeral 5) of the female connecting means which cooperates with the bent locking element (6*b*). In practice, this locking part is formed by providing an inwardly directed recess in the respective side of the adjacent profiled strip (1').

FIG. 5 shows, in various steps (I-IV), a possible embodiment of the method according to the invention. In this case, the first end side (3A) is initially (step I) subjected to a milling operation in order to produce the required corresponding recesses and projections so as to produce the (hook-shaped) connecting means. In addition, the projecting element (6*a*) is provided on the first end side (3A) by means of a milling operation, which element will be bent later by means of heating. Heating will be effected by means of a heating element, e.g. infrared heater, an industrial heater or a heating nozzle with hot air which will bring the material to the suitable temperature at which the material of the projecting element (6*a*) becomes mouldable. Preferably, the produced projecting element (6*a*) is heated at the location of its base (13) (see circled area in step II). The base (13) of the projecting element (6*a*) is the location where the projecting element (6*a*) adjoins the profile body of which it forms part. Once the material is mouldable, the projecting element (6*a*) is bent (step II) by means of an element, which was developed specifically for the purpose, so as to be bent at a desired angle in the direction of the respective profile body and to be held there temporarily until the material has cooled down. In a preferred embodiment, the projecting element (6*a*) is actively cooled while it is being held (step III), for example by passing coolant through the element which will temporarily hold the projecting element (6*a*). After cooling, a bent locking element (6*b*) is formed which preferably partly bears against a part of the profile body, preferably this part is curved and forms a support for the bent locking element (step IV). The distal end of the bent locking element (6*b*) does not bear against the profile body, but is situated at a small distance therefrom, as a result of which it is displaceable (depressable) only to a very slight degree. Such an embodiment makes it possible for the bent locking element (6*b*) to at least be displaced partly in the direction of the profile body while connection takes place in order thus to facilitate the locking operation. After the connection has been achieved, the displaced part of the bent locking element (6*b*) will return to its original position, to that it will make contact, in the connected position, with a wall of the female connecting means and will be locked. The bent locking element (6*b*) and the locking part (5) cooperating therewith of an adjacent profiled strip is provided in order to produce a vertical lock (4) between adjacent profiled strips (1,1').

FIGS. 6 and 7 also show two possible other embodiments of the method according to the invention, in which the distal end of the bent locking element (6*b*) is directed towards the underside (being the side opposite the visible side (V)) of the profiled strip (1) after bending a milled projecting element (6*a*).

A profiled strip (1) which is provided with a bent locking element (6*b*) which has been produced by means of thermoforming, wherein a milled projecting element (6*a*) is heated and subsequently bent, has the advantage that the freedom of design for the bent locking element (6*b*) is relatively great. The milled projecting element (6*a*) and the bent locking element (6*b*) formed therefrom may be dimensioned such that such profiled strips (1,1') can readily be locked to each other by applying only a small force (pushing with a thumb), whereas many other connecting systems require a great force (use of a hammer). In addition, two profiled strips (1,1') connected to each other can easily be disassembled without the risk of the bent locking element (6*b*) breaking off.

According to a preferred method, in order to produce the aforementioned support for the bent locking element (6*b*), as is visible, inter alia, in FIGS. 1 to 5, a first inwardly directed recess (9) and a second inwardly directed recess (10) adjoining the former are provided on the first end side (3A) during the execution of said milling operations, as is shown in FIG. 2*b*, and the produced projecting element (6*a*) is bent after heating in such a manner that it is situated against the transition between the first and second produced recess. Preferably, the second recess (10) is deeper than the first recess (9). The recesses (9, 10) adjoin one another, as can clearly be seen in FIGS. 1 and 2. In this embodiment, they have a curved configuration. In this case, in this embodiment, the transition (12) between the first (9) and second recess (10) will form a contact surface (support surface) for the bent locking element (6*b*), as illustrated in FIG. 2*b*.

The respective recesses (9 and 10) allow for greater flexibility of the bent locking element (6*b*) and make it possible to disassemble the profiled strip (1) again after it has been connected to an adjacent profiled strip (1') without causing damage, such as the bent locking element (6*b*) breaking off at the base (13). The reason for this is that, in practice, disassembling will occur by means of a tilting movement at the end side (3A; 3B) of the connected profiled strips with respect to each other. The various possible embodiments of transition (12) between the second recess (10) and the first recess (9), more specifically the depth of the second recess (10), will, in a number of embodiments, contribute to greater flexibility of the flexible part of the bent locking element (6*b*), which is a requirement in order to be able to disassemble the respective profiled strips by means of a tilting movement. Because of the greater flexibility of the bent locking element (6*b*) as a result of the foregoing, the bent locking element (6*b*) will consequently break off less easily at its base (13) when tilting the foldable lip away in a direction away from the transition (12) when disassembling the adjacent profiled strip.

In addition, the force to be exerted vertically in order to connect the profiled strips (1,1') to each other, will, in various ways and depending on the type of base material, be made greater or less great. This force to be exerted vertically defines whether a vertical force is to be exerted using a hammer or whether a vertical pressure exerted only by a thumb (or another finger) suffices to produce a lock.

The fact is that, as can be seen in FIGS. 9, 10 and 11, the depth and shape of the first and/or second recess may be modified. In a specific embodiment, the second recess may also be omitted (see, inter alia, FIGS. 9*g* and 9*h*, FIG. 10 and FIG. 11).

By modifying the depth of the first recess (9), the thickness and the design of the projecting lip of the bent locking element (6*b*) may be modified. As is illustrated in FIG. 10, a deeper first recess (9) makes it possible to make the bent locking element (6*b*) (lip) thicker. Whereas most figures show a locking lip having a thickness of 0.5 mm, the locking lip shown in FIG. 10 has a thickness of 0.8 mm. It is also possible to modify the shape of the projecting lip (6*b*). The addition of a constriction (see e.g. FIG. 9*a*) will contribute to the flexibility of the lip. These modifications to the embodiments of the bent locking element (6*b*) of the recess (s) will have an effect on the vertical locking force to be exerted without adversely affecting the actual vertical locking strength of the profiled strips after installation.

In the embodiment illustrated in FIG. 10 as well, the vertical locking strength may be increased by, on the one hand, making the first recess (9) deeper and, on the other hand, making the projecting element (6*a*) (and consequently also the locking lip formed therefrom (its bent element (6*b*)) thicker. Although normally the locking lip has a thickness of between 0.2 and 0.8 mm, this embodiment makes it possible to make the locking lip thicker, up to between 0.8 mm and 1.2 mm.

In the embodiment as illustrated in FIG. 2*b*, which, in addition to the flexible bent locking element (6*b*), also uses two recesses (9 and 10) on the end side (3A) (in particular the first recess (9) and the second recess (10)), the vertical locking force may also be controlled by modifying the distance (AB). In this case, (A) is the point at which, after bending, the bent locking element (6*b*) comes in to contact with the part of the profiled body which forms the support and (B) is the distal end of the bent locking element (6*b*). By increasing or decreasing this distance (AB), the vertical locking force to be applied will also increase or decrease, without having an adverse effect on the actual locking strength on the end or longitudinal sides after installation of the profiled strips.

FIG. 8 shows an alternative method in which a bent locking element (6*b*) can be produced, albeit without applying the bending procedure, but by using a milling operation.

As is clear, inter alia, from FIG. 2*a*, the second end side or the second longitudinal side is of a female design, suitable for accommodating the second male connecting means. In a possible embodiment, the second end side or the second longitudinal side comprises a flexible projection (7) and the first end side furthermore comprises a recess (8), wherein the flexible projection (7) is configured to perform a bending movement in the direction of the adjacent longitudinal or end side while the adjacent profiled strips are being connected in order then to at least partly bend back into its original position when engaging the first or second male connecting means in the first or second female connecting means. Said flexible projection (7) will also produce a vertical lock by engaging in the adjacent recess. However, such a projection (7) and corresponding recess (8) is not required and may, as can be seen from FIGS. 3 and 4, equally well be omitted. As omitting the respective projection (7) and corresponding recess (8) may have a negative impact on the vertical locking strength, this may, as has already been explained, be compensated for by modifying the designs of the bent (locking) element (6*b*) and/or modifying the design of the end side where one or two recesses (9, 10) may be provided.

The profiled strips produced by means of the method are preferably elongate floorboards which are substantially composed of a polymer or polyolefines. Obviously, other embodiments, such as e.g. square, or wall parts provided with connecting means as described in the present text also fall within the scope of protection of the present invention.

In a connected position, the floorboards define a vertical surface. The materials for producing the profiled strip (1) which may possibly be used depend on the mechanical properties. The profiled strip (1) has a decorative finish on the top side. The profiled strip according to the present invention preferably has a thickness of between 3 mm and 12 mm, in particular a thickness of 4 mm to 6 mm.

The profiled strip (1) produced by means of the method is made in a single part and comprises a visible side (V) having at least one transparent wear layer. The profiled strip is made from plastic, preferably PVC or polyolefines. The profiled strip comprises one or several mineral fillers, possible fillers being chalk or talc. Preferably, at least 2%, more particularly at least 10% fillers are present in the profiled strip. The profiled strip (1) furthermore preferably comprises a number of process stabilizers for the heat resistance during processing, such as for example lead (Pb), calcium-zinc (Ca—Zn) or tin (Sn).

The bent locking element (6*b*) in the profiled strip (1) produced in accordance with the method may be directed upwards (see, e.g. FIGS. 1, 2, 3, 4, 5, 9 and 10) in the connected position of two adjacent profiled strips. The bent locking element (6*b*) may also have different embodiments by giving the projecting element (6*a*) a well-defined design by means of a milling operation, as is shown in FIGS. 9*a* to 9*h*.

Using the method according to the invention, it is also possible (see FIGS. 6, 7 and 11) to produce a downwardly directed bent locking element (6*b*). In this case, the side of the profiled strip where the bent locking element (6*b*) is to be arranged is subjected to a milling operation in order to produce a projecting element 6*a* (see FIG. 11*b*). Subsequently, this may be heated, bent and, optionally, allowed to cool, as has been described above, so that a downwardly directed bent locking element (6*b*) (see FIG. 11*c*) is produced. Such an embodiment has the advantage that, in contrast to an upwardly directed bent locking element (6*b*), by means of the bent locking element (6*b*) a direct point load is no longer exerted just below the (transparent) top layer (15), as a result of which the risk of damage to the top layer is much less than is the case with upwardly directed locking elements. With upwardly directed locking elements, in the connected position, the pressure exerted by the distal end on the adjacent wall (locking part) may cause damage to the top layer due to the fact that little material is present between the top layer and the contact surface with the distal end of the bent locking element (6*b*) of an adjacent profiled strip.

This method according to the invention is also applicable to the connections as illustrated in FIG. 11, where a bent locking element (6*b*) is produced after milling and bending in the female connecting means and thus not in the male connecting means. By way of example, FIGS. 11*a* to 11*d* show the most important steps for bringing about the connection between two adjacent profiled strips by means of their end and/or longitudinal sides. In this case, the sides are provided with hook-shaped connecting means by performing a milling operation.

The second side is shown in detail in FIG. 11*a* and comprises a stop face (11) which will produce the connecting area (CS) with an adjacent profiled strip. Next to the stop face (11), a recess is provided which forms a locking groove (14) for the locking element (6*b*) provided on the first side of an adjacent profiled strip.

The first side is also subjected to a milling operation in order to produce a projecting lip (6*a*), as is shown in FIG. 11*b*. This lip (6*a*) is then heated locally and bent downwards and temporarily cooled down in order to produce a downwardly directed bent element (6*b*), as is shown in FIG. 11*c*, which will form the bent locking element (6*b*). FIG. 11*d* shows the connected position of two sides of the profiled strip.

The invention claimed is:

1. A method for producing a profiled strip comprising a first longitudinal side provided with first male connectors, a second longitudinal side provided with first female connectors, a first end side provided with second male connectors, and a second end side provided with second female connectors, wherein the second longitudinal side is situated opposite the first longitudinal side, the second end side is situated opposite the first end side, and the first and the second male connectors are configured to engage connectors identical to the first and the second female connectors, respectively, wherein the method comprises the following steps:

supplying a panel-shaped profiled section made of plastic;

sawing the panel-shaped profiled section to a desired length;

performing one or more milling operations, to produce at least one foldable, flexible projecting element on an end side of the sawed profiled section; and heating the produced at least one foldable, flexible projecting element and subsequently bending the produced at least one foldable, flexible projecting element at a desired angle, in order to form a bent locking element.

2. The method for producing a profiled strip according to claim 1, further comprising bending the produced at least one foldable, flexible projecting element to bear against a body of the profiled section.

3. The method for producing a profiled strip according to claim 1, wherein the profiled strip comprises a visible side with at least one transparent wear layer.

4. The method for producing a profiled strip according claim 1, wherein the profiled strip is made from plastic.

5. The method for producing a profiled strip according claim 1, wherein the profiled strip comprises one or several more mineral fillers.

6. The method for producing a profiled strip according to claim 1, wherein the profiled strip comprises a plurality of process stabilizers for heat resistance during processing.

7. The method for producing a profiled strip according claim 1, further comprising, after the bending, temporarily holding the produced at least one foldable, flexible projecting element in a bent position while cooling down the produced at least one foldable, flexible projecting element.

8. The method for producing a profiled strip according to claim 1, further comprising providing a first inwardly directed recess on the first end side during performance of the one or more milling operations.

9. The method for producing a profiled strip according to claim 8, further comprising providing a second inwardly directed recess adjoining the first inwardly directed recess during performance of the one or more milling operations.

10. The method for producing a profiled strip according to claim 9, further comprising bending the produced at least one foldable, flexible projecting element after the heating in such a manner that the produced at least one foldable, flexible projecting element bears against a transition area between the first inwardly directed recess and the second inwardly directed recess.

11. The method for producing a profiled strip according claim 1, wherein the profiled strip comprises a decorative top layer.

12. The method for producing a profiled strip according claim 1, wherein the profiled strip has a thickness of between 3 mm and 12 mm.

13. The method for producing a profiled strip according claim 1, wherein the profiled strip has a thickness of between 4 mm to 6 mm.

14. The method for producing a profiled strip according claim 1, wherein the produced bent locking element is directed upwards.

15. The method for producing a profiled strip according claim 1, wherein the produced bent locking element is directed downwards.

16. The method for producing a profiled strip according to claim 1, wherein the produced bent locking element has a thickness of between 0.2 mm and 1.2 mm.

* * * * *